United States Patent Office 3,050,478
Patented Aug. 21, 1962

3,050,478
SOLIDIFIABLE FLUID COMPOSITIONS PREPARED FROM ENEDIOYL ACIDS, EPOXIDIZED HYDROCARBON DRYING OIL, AND CONJUGATED DIENES
Sol B. Radlove, Chicago, Ill., assignor to The Glidden Company, Cleveland, Ohio, a corporation of Ohio
No Drawing. Filed July 28, 1958, Ser. No. 751,109
21 Claims. (Cl. 260—18)

This invention relates to potting compositions, adhesives, coating materials, etc. which are initially in a fluid condition and which can be solidified by chemical reaction of the component materials. The compositions can be used for a variety of purposes, some of which are mentioned above, but their use as potting compositions imposes more requirements than other uses, so in the following description of the invention this use will be emphasized. This should not be construed, however, as excluding the compositions from any other appropriate uses.

Potting compounds, to serve their intended purposes, should be entirely solidifiable so that during curing no liquid or gaseous products of reaction, or solvents, will need to be dissipated. In other words, the composition should be 100% solidifiable. In addition the composition should be sufficiently fluid in its initial, uncured condition so that it can be poured into an assembly, such as an intricate electrical device, and can there not only displace the air but penetrate into all the interstices of the device. In this way the potting compound, when cured to a solid condition, can be easily made to enclose and support the potted device. Furthermore, the potting compound should exhibit as little shrinkage as possible in being converted from a liquid to a solid condition since shrinkage might readily damage the potted device. In addition, shrinkage of the potting material could well lead to a potted assembly which would not be hermetically sealed, as is desired. The potting compound, especially for electrical work, should be a good electrical insulator, should be capable of withstanding moderate degrees of heat without charring or undergoing other kinds of decomposition, should adhere well to metals and should not be affected appreciably by various solvents, oils, liquid fuels, water, fumes, etc. These stringent requirements on potting compounds make it difficult to find appropriate reactive compositions which can be converted from an initially liquid condition to a final solid, relatively inert condition.

Epoxidized polymeric hydrocarbon drying oils containing residues of conjugated diolefins which are reactive by reason of oxirane oxygen groupings therein replacing at least 10% of the original double bonds, with or without reactivity due to unsaturated carbon-carbon linkages or other functional groups inherently possess attributes which recommend them for use in potting compounds. They can be readily solidified by heating or otherwise reacting them with di-, tri-, or other polybasic acids, e.g. dicarboxylic acid or anhydrides, di- or tri-basic mineral acids such as phosphoric, etc. which are at least partially soluble therein. However, such epoxidized oils are very viscous liquids at room temperature. One problem which has impeded the use of such epoxidized oils for potting work has been that of finding a suitable reactive diluent which could be combined therewith to render them sufficiently fluid for potting work. I have now discovered that conjugated dienes which are normally-liquid or which have a moderately low melting point are good diluents for such viscous liquids, and that by appropriate combinations with polycarboxylic dienophiles, the diluent-epoxy oil mixture can be made to cure entirely to a solid state with negligible shrinkage. Viscous epoxy resins or normally-solid epoxy resins such as the commercial bisphenol/epichlorhydrin resins can be similarly liquified for potting and other work.

Accordingly one object of this invention is to provide 100% solidifiable fluid compositions prepared from a combination of (a) epoxidized polymeric hydrocarbon drying oils containing residues of conjugated diolefins, (b) conjugated dienes which are liquid at temperatures below about 70° C. and are compatible with said epoxidized hydrocarbon drying oils, and (c) polycarboxylic dienophiles soluble in a blend of (a) and (b).

Another object is to provide 100% solidifiable, liquid compositions which employ viscous to normally-solid epoxidized material in combination with polybasic acid curing material, and which are especially adapted for use as potting compounds.

Another object is to provide as a commercial article of manufacture, a stable, potentially-reactive mass composed essentially of epoxidized polymeric hydrocarbon drying oil containing residues of conjugated diolefins, and reactive diluent, the latter being effective in character and amount to materially reduce the viscosity of the epoxidized oil, and also being effective to form adducts with polycarboxylic dienophiles.

These and other objects will be apparent from the following description of my invention.

The principles of my invention can be illustrated conveniently by selecting a particular epoxidized oil for discussion. Other epoxy materials identified hereinafter could be selected equally well, but the material presently selected for purposes of illustration is an epoxidized hydrocarbon drying oil which has been prepared from butadiene and styrene by solvent polymerization using sodium as the polymerization catalyst. This kind of polymeric hydrocarbon drying oil and its preparation is described in U.S. Patents 2,652,342 and 2,762,851 and the epoxidation thereof is described in my copending application Serial No. 515,783, filed June 15, 1955, now abandoned. The epoxidized hydrocarbon drying oil, as a novel composition of matter, is described and claimed in copending application Serial No. 515,208, filed June 13, 1955, now abandoned. The disclosures of these patents and applications are here included by reference. A typical epoxidized oil of the type referred to can have an oxirane oxygen content of 6%, but oils of higher and lower oxirane oxygen values can be used herein. I prefer an oxirane oxygen content between about 2.3% and 7.5%. The latter is a non-critical upper limit since any oxirane content up to the theoretical content for a particular material at hand can be used.

A 6% oxirane oxygen epoxidized oil of the foregoing type, when stripped of solvent to a 100% solids condition, is a clear, highly-viscous material which flows very slowly (e.g. an inch per hour) out of a container when the latter is tilted to a 45° downward angle. By adding alloocimene, for instance, to it and warming the mixture on a steam cone with stirring there is soon formed a homogeneous solution. When the solution is cooled to about room temperature, it is observed to be a pourable liquid. Its fluidity depends on the proportion of alloocimene added, and hence can be adjusted readily to fit one's immediate needs.

It will be understood that alloocimene is a liquid terpene having the following aliphatic structure:

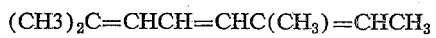

$(CH3)_2C=CHCH=CHC(CH_3)=CHCH_3$

The conjugated unsaturation therein makes it possible to condense alloocimene by the Diels-Alder reaction with dienophilic polycarboxylic acids or anhydrides, such as maleic acid or anhydride but for my purposes it is not necessary to pre-form the adduct. Instead, the epoxidized oil and alloocimene are blended together as above to form a stable mixture or solution and then, just before conversion is desired, the polycarboxylic dienophile is stirred in. The resulting acidified mixture is then poured into the container in which a potted article is to be formed. Chemical reaction occurs promptly, and can be hastened if desired by heating moderately. Maleic anhydride is an example of dienophiles which work well to effect curing. It reacts slowly at room temperature, and rapidly at slightly higher temperatures, and promotes curing of the potting mixture to a hard, clear, resinous solid.

In my reactive systems of the type last described, I believe the dienophilic anhydride or acid undergoes in-situ Diels-Alder type adduct-formation with the alloocimene. Some similar addition with residual unsaturation of the epoxidized hydrocarbon oil may occur but is presently believed to be negligible.

The various components of my system are hereinafter described in more detail under their separate headings.

THE EPOXY COMPONENT

Various epoxy materials can be used as or in the epoxy component of my solidifiable system. The two most common materials at the present time are: (a) the epoxidized hydrocarbon drying oils briefly described above, (b) the commercial epoxy resins (such as those of epichlorhydrin-bisphenol type) which are normally viscous to solid resins. These materials, because of their physical attributes, directly raise the problem of securing low viscosity solutions which are preferably of the 100% convertible type. Other epoxy materials which are curable by the present invention may not raise this problem. Instead, in the case of normally-liquid epoxy materials, the problem which accompanies their use is of keeping them in a liquid condition while formulating a finished 100% solidifiable product. Epoxy materials of this category are the low-viscosity epoxy resins, the epoxidized glyceride oils, the monomeric (or essentially so) diepoxides of cycloaliphatic esters (see U.S. Patent 2,716,123) and crude monoepoxide of diallyl phthalate. It will be recognized that the epoxidized glyceride oils can be of the viscous type where for instance the glyceride oil is bodied before it is epoxidized.

The foregoing epoxy materials will now be discussed separately in more detail as representing materials which can be cured alone or in admixtures with each other. Other epoxy materials not herein specifically mentioned, can, of course, be used and should not be understood as being excluded merely because of lack of specific mention.

Epoxidized Hydrocarbon Drying Oils

The hydrocarbon drying oils which can be epoxidized to give the oxirane-containing component of my system, as noted above, include the sodium-polymerized, peroxide-polymerized, $BF_3$-polymerized, and other oily homopolymers or copolymers which contain residues of conjugated dienes, preferably conjugated dienes having 4 to 6 carbon (e.g. butadiene) with any remainder being composed of ethylenic monomeric compound(s) containing the $CH_2=C—$ group. Thus the homopolymeric oils are exemplified by oily polybutadiene, and the copolymer oils are exemplified by oily butadiene (60–99%)/styrene (40–1%) copolymers. U.S. Patents 2,652,342 and 2,762,851 described many other oily copolymers, all of which are appropriate for use herein after having been epoxidized to oxirane oxygen contents of about 2.3% or above. This corresponds to about 10% of the double bonds in such copolymers. Methods for preparing free-radical and sodium-polymerized homopolymers and copolymers having $C_4$–$C_6$ conjugated diolefins combined into their structures are disclosed in U.S. Patents 2,652,342, 2,762,851, 2,569,383, 2,701,850, 2,636,910, 2,712,562, 2,708,639, 2,777,890 and 2,559,947, the disclosures of which are here incorporated by reference. I prefer the polymers and copolymers having molecular weights in the range of 1000 to 15,000 and particularly prefer the sodium-polymerized butadiene/styrene copolymers prepared from about 60–90% butadiene, balance styrene. Such and other similar drying oils are presently available as commercial products, as are the homopolymeric sodium-, peroxide and $BF_3$-polymerized polybutadiene drying oils, and hence can be obtained readily for use as the raw materials from which my epoxidized oils can be prepared.

$BF_3$-polymerized polybutadiene drying oils are described in U.S. Patent 2,708,639, the disclosure of which is here incorporated by reference.

Various moderately-unsaturated petroleum fractions such as the ones described in U.S. Patent No. 2,471,266 can be epoxidized and then employed along with the drying oil epoxy-derivatives described above.

The epoxidation of hydrocarbon drying and/or non-drying oils can be carried out in any of the various ways disclosed in the prior art, most of which employ peracids which have either been preformed or are formed in-situ. However, I prefer to use methods which are known to give products having low acetyl values, e.g. below about 60. The method disclosed in the copending application S.N. 515,783, supra, is effective in giving good yields of products having useful oxirane oxygen contents with low acetyl values. U.S. Patent 2,660,563 describes other methods.

Hydroxylated hydrocarbon drying oils (e.g. hydroxylated polybutadiene; U.S. Patent 2,692,892) can of course be used along with the epoxidized oils if the water which is liberated on esterification with the polycarboxylic acids is not harmful to the purpose which one wants to accomplish. For potting work, however, and for various other uses such as laminating, the so-liberated water can lead to porosity in the solidified mass, or to haziness, poor electrical resistance, etc. Hence, I prefer to keep the acetyl value of the epoxidized drying oil component no higher than can be tolerated in any particular end use of my solidifiable compositions, preferably less than about 35.

According to the method described in copending application, S.N. 515,783 supra, a hydrocarbon drying oil is gradually contacted with hydrogen peroxide at temperatures maintained between about 20° C. and 50° C. in the presence of formic acid and a catalytic amount (e.g. 0.25–2.5% by weight on the oil) of oxygen-containing mineral acid (e.g., sulfuric or phosphoric). A diluent-modifier (e.g. acetic acid or mixtures of acetic acid and water) is desirably present also in an amount between about 10% and 55% by weight on the hydrocarbon oil. In accordance with the principles of the method, performic acid is formed in-situ by reason of the presence of the mineral acid. The process gives good yields of oxirane oxygen with concomitantly low acetyl values, and the treatment can be continued with gradual addition of hydrogen peroxide until a desired oxirane content approaching the theoretical maximum or any lesser content has been secured. The resulting epoxidized oil is then recovered, washed, dried, etc.

The epoxidized hydrocarbon drying oil(s) preferably constitute the entire epoxy component of my invention but less preferably can constitute as little as 50% thereof. In the latter case, other epoxidized and/or hydroxylated materials constitute the remainder, e.g. epoxidized petroleum fractions, epoxy resins, epoxidized glycerine oils (2.5–7.5% oxirane oxygen) crude monoepoxidized diallyl phthalate, hydroxylated polybutadiene and other materials. These supplementing ester-forming materials partake of reactive diluent functions and are described more fully hereinafter under separate headings.

Epoxy Resins

The epoxy resins which are contemplated are complex polymeric, resinous polyether derivatives of polyhydric phenols and are preferably composed of polyether derivatives of dihydric phenols with polyfunctional halohydrins, said derivatives being free of functional groups other than epoxy and hydroxyl groups, having alternating aromatic and aliphatic nuclei united through ether oxygens and having terminal 1, 2 epoxy groups. The dihydric and/or polyhydric phenols and polyfunctional halohydrins are reacted in manners and proportions well understood in the art (for example, Greenlee Patent No. 2,521,911, here incorporated by reference) so as to form a complex resin of the type described above. Epichlorhydrin and glycerol dichlorhydrin are examples of polyfunctional halohydrins, while resorcinol and bisphenol are examples of dihydric phenols useful in forming such epoxide resins. Bisphenols may be prepared by methods such as are described in U.S. Patent No. 2,182,308 using various phenols and various aliphatic and/or cycloaliphatic ketones having up to 6 carbons in each chain attached to the keto group.

The complex epoxide resins contemplated for use in my invention can have a wide range of functionality due to the relative proportions of epoxy and hydroxyl groups in the molecule. Excellent coating compositions can be prepared in accordance with the invention by employing bisphenol-epichlorhydrin resins having an epoxide equivalent of from 210 to 4000, corresponding to an hydroxyl equivalent of 80–200. It is known that the epoxy equivalent weight or the epoxy-plus-hydroxyl equivalent weight of any complex epoxide resins such as described above may be related somewhat to the "$n$" value of the formula which theoretically expresses the general chemical nature of the resins resulting from condensation of a polyhydric phenol with epichlorhydrin. Such a formula is:

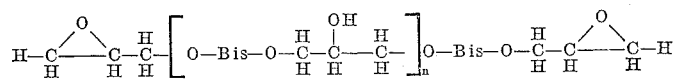

where —O-Bis—O— represents a dihydric phenolic residue such as the bisphenol residue:

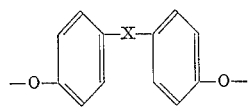

wherein X is the hydrocarbon residue of any cyclic ketone of up to 6 carbons, inclusive, or is the group

in which R represents any alkyl, aryl or alicyclic group having through 6 carbons and R' represents any alkyl group of up to 6 carbons, inclusive. The "$n$" value of the epichlorhydrin-bisphenol condensate may vary from about 0 to about 7 in resins which I have found to be satisfactory for use in preparing my compositions, but I prefer "$n$" values between 0 and about 3. Various complex epoxy resins of the types described above are currently available as commercial products under the trade-name of "Epon Resins" (Shell Chemicals Company) and Ciba Araldite Epoxy Resins, and are supplied by Shell with information concerning their epoxy and epoxy-plus-hydroxyl equivalents. The "Epon" and/or Ciba Epoxy Resins referred to hereinafter in the examples are the reaction products of epichlorhydrin and 4,4' - dihydroxyl - diphenyl - 2,2-propane.

Some of the commercial epoxy resins referred to above are normally viscous-to-solid products. A few of them, however (e.g. Epon 834) are liquids at normal room temperature. The normally liquid products can, of course, be used to thin out the normally viscous-to-solid resins, but ordinarily such mixtures can advantageously be thinned further with a reactive diluent thereby to secure or maintain a low viscosity while increasing the total weight of solidfiable material and lowering overall cost. It is in these and other respects that my present system represents an advance in the art in respect to epoxy resin pottings and like 100%-convertible formulations. When a particular formulation desirably excludes normally-liquid epoxy resins in favor of the normally viscous-to-solid resins, then my reactive diluent component serves the same advantages already discussed above in connection with the viscous epoxidized hydrocarbon drying oils.

EPOXIDIZED GLYCERIDE OILS

These epoxidized oils should preferably have an oxirane oxygen content between about 2.5% and 7.5% when employed in the present invention. At these oxirane levels, the products are generally normally-liquid. However, if the glyceride oil(s), prior to being epoxidized, has been bodied by means of heat/or catalyst(s) then the resulting epoxidized oil can be quite viscous at room temperature. My reactive-diluent component can be used in combination with any of the epoxidized glyceride oils for advantages of the types already pointed out above. The oils should preferably have a low acetyl value (e.g. below about 60) for potting and analogous 100%-convertible uses.

The Diepoxides of Cycloaliphatic Esters

The preparation of these diepoxides is described in U.S. Patent No. 2,716,123, the disclosure of which is here incorporated by reference. The diepoxides are there shown to be represented by the general formula:

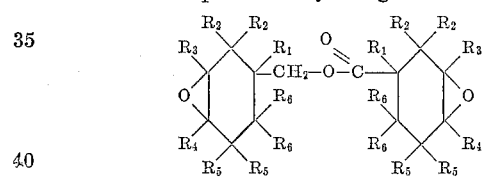

wherein $R_1$ through $R_6$ represent members selected from the group consisting of hydrogen and lower alkyl radicals. These diepoxides, like each of the foregoing epoxy materials, can be the sole ingredient of my epoxy component, but since many of them are free-flowing liquids at room temperature, they can also be used in my invention in combination with the other epoxy materials, especially when the other are normally viscous-to-solid. A commercial product consisting essentially of diepoxides conforming to the above formula is being marketed under the designation EP–201.

The Crude Monoepoxide of Diallyl Phthalate

Methods for preparing this product are described and claimed in a copending U.S. application Serial No. 758,894, filed September 4, 1958, now abandoned the disclosure of which is here incorporated by reference. Other diallyl esters can, of course, be epoxidized in similar manner to give crude monoepoxide products, but I especially prefer the crude product obtained by epoxidizing diallyl phthalate. After preparing this or other comparable neutral allyl esters of di- or higher carboxylic acids, the expoxidation can be effected in any of the known, conventional manners, e.g. by treatment of the esters with preformed peracids such as performic peracetic, perbenzoic, etc. or by treating with a mixture of hydrogen peroxide and peracid-forming acids. The latter treatment is preferably carried out in the presence of a small amount of oxygenated mineral acid such as sulfuric or phosphoric.

In accordance with one example of the application identified above, where 100 grams of diallyl phthalate was agitated at 40° C. while 1440 grams of 40% aqueous peracetic acid (containing 93 grams of anhydrous sodium acetate) was gradually added over a period of one hour, then was held at 40° C. for 16 hours, and finally was washed three times with (1000 ml. each), once with saturated brine and then with aqueous sodium carbonate until the wash liquor was alkaline to litmus paper, the dried product (dried by heating in vacuo at 60–65° C.) after being filtered, appeared by infrared analysis to consist of 40% glycidyl allyl phthalate, 40% glyceryl allyl phthalate, about 10% diallyl phthalate and balance diglycidyl and/or diglyceryl phthalate. This product was a free-flowing liquid at room temperature, had an oxirane oxygen content of 5.0% by weight and could be polymerized by itself by treatment with an organic peroxide catalyst, and of course, could be reacted with polycarboxylic acids to form ester cross-linkages by opening the oxirane groupings. One will recognize that the glycidyl allyl phthalate of the crude product, as well as the glyceryl allyl phthalate thereof are tri-functional and hence can form three-dimensional polymers when conditions are such as to employ all available functionality. The crude product is especially useful in the present invention as a reactive viscosity-reducer, serving functions in this respect similar to those already described above for the liquid epoxy resins, the epoxidized glyceride oils and/or the liquid diepoxides of cycloaliphatic esters.

Glycidyl Allyl Phthalate

The resin-forming properties of this product are described in U.S. Patent No. 2,476,922. The product can be used in the present invention in the same way as the crude monoepoxides of diallyl phthalate, in which it is present. Mixtures of the two products can of course be used, if desired.

The Reactive Diluent Component

This component of my compositions, as explained briefly above, functions as a reactive solvent-thinner for the highly viscous or solid epoxy materials of the epoxy component. For this function it should be normally-liquid or should have a moderately low melting point (e.g. 60–70° C.). It should necessarily be compatible with the epoxy component so that the two-component blend can subsequently be solidified to a homogeneous essentially-single-phase mass. The reactive diluent component, whether it be a single material or a mixture of materials, need not be composed of pure unsaturated (and hence reactive) compounds, since many commercial products which are useful as reactive diluents herein contain minor amounts of impurities which are not reactive but which do not interfere with the desired objective of producing a useful solidified mass. Some of the associated impurities can function as plasticizers, others as extenders. Such impurities can in some instances be leached out of the solidified potted mass by extraction methods, showing that they are not chemically combined with the other materials of the solidified mass. If the presence of such extractable impurities is deleterious in a particular end use of the solidified mass, then of course one should work with more pure reactive diluents.

One important feature of the concept from which the present invention stems is that of using a diluent which is unreactive with the epoxy component at normal atmospheric temperatures after it has been blended or otherwise combined with the latter. At the same time, however, the diluent should be capable of forming an adduct with the polycarboxylic dienophile(s) subsequently added to the two-component mixture to solidify it. The conjugated dienes are especially preferred because of the relative ease with which they form Diels-Alder adducts with the polycarboxylic dienophiles. This statement should not be construed, however, to exclude the use of materials which are not initially conjugated dienes since some materials, in the presence of acids and/or heat, can undergo transformation to a conjugated diene structure. Thus, a significant test for the appropriateness of a selected diluent or diluent mixture is that of determining whether or not the said diluent is capable of forming adducts with the polycarboxylic dienophiles under the conditions which are to be used in curing the epoxy component/reactive diluent component mixture.

One function of a reactive diluent is, of course, to react chemically with the polycarboxylic dienophiles of the three-component solidifiable mass, when the latter is solidified. This is accomplished when at least a part of the diluent forms an adduct with the polycarboxylic dienophile(s) since the adducts so formed then become chemically bonded to the materials of the epoxy component through the ester linkages which are formed by reaction of the carboxyls with the oxirane oxygen groups and with the hydroxyl groups which are formed from the latter. Such chemical integration of the three-component mass need not exclude other types of chemical bonds, however.

Following is a partial list of unsaturated reactive diluents found useful by themselves or in admixture with others for the purposes of my invention.

Terpenes:
    Ocimene
    Alloocimene
    Myrcene
    α-Terpinene
    Beta phellandrene
    2,4(8) p-menthadiene
    2,4(5) p-menthadiene
    3,8 p-menthadiene Glyceride oils:
    Conjugated linseed oil
    Tung oil
    Dehydrated castor oil
    Oiticica oil
    Conjugated soy bean oil The adduct-forming quantities of terpenes with α, β unsaturated dicarboxylic acids are well known as shown by the following U.S. Patents: 2,208,321, 2,234,958, 2,252,393, 2,253,681, 2,294,651, 1,993,025, 1,993,031, 1,993,034, 1,993,035, 2,347,970, 2,348,575. The adduct-forming qualities of the above and other less common glyceride oils is also well known.

The proportions of total reactive diluent to epoxidized polymeric drying oil can, of course, be varied. Normally the proportions are selected so that the resulting mixture or combination can be handled conveniently in producing the solidified mass which is desired. For potting work, as explained above, this entails the use of enough reactive diluent to produce a fluid, free-flowing mass. For lamination work or for preparing pressure-molded articles such as pipe (U.S. Patent 2,814,313) the mass need not be so fluid. The proportions in any particular situation will vary with the viscosity of the epoxy component, with the specific properties of the reactive diluent or diluent mixture employed, with the temperature at which the two-component mass is to be worked into a desired solidified form, with the amount and specific physical properties of the polycarboxylic dienophile(s) used, and with the physical properties which are desired in the finished solidified mass. Accordingly no significant numerical values can be stated in respect to the proportions other than to indicate that I presently prefer to have the epoxidized hydrocarbon drying oil constitute at least 50% of the total unacidified fluid mass when the oxirane oxygen content of the oil is around 5–6%. However, one skilled in the art can readily determine the proportions which apply to the particular materials he selects for use in accordance with the present teachings, when guided by the examples included hereinafter.

Extenders

There are various inexpensive organic materials which can be used in my 100% solidifiable base products as extenders. Non-restrictive examples are rosin, tall oil, pine tar, pitch, and "diterpenes" of molecular weight 272 and formula $C_{20}H_{32}$ (see U.S. Patent 2,208,321). Some components of such products are adduct-formers and hence partake of some functions of reactive diluents. However, other components can react in the potting composition in other ways, as by forming esters. In any event, the materials have been found beneficial and useful as bulking agents and cost-reducers.

*The Polycarboxylic Dienophiles*

The term polycarboxylic dienophile has been used hereinabove and is used hereinafter to identify the soluble acidic reagent(s) used to convert my stable fluid masses to the solid state. The acidic materials so identified can be polycarboxylic acids or their anhydrides (where such can exist), and are further characterized by their ability to form adducts with ethylenically-unsaturated materials contained in or composing the reactive diluents. This ability stems from their conjugated unsaturation, such as exists in $\alpha$, $\beta$ unsaturated dicarboxylic acids or anhydrides (e.g. fumaric acid, maleic acid, or maleic anhydride). Thus, the polycarboxylic dienophiles are mainly the $\alpha$, $\beta$ unsaturated dicarboxylic acids and/or anhydrides, since these are the dienophiles which are most readily available. However, I contemplate the use of less common acids and/or anhydrides which have more than two actual or effective carboxyl groups and possess conjugated unsaturation in respect to at least one of such groups.

In commercial work, the rate of solidification is generally quite important, and for this and other reasons, I especially prefer to use maleic anhydride. Monochloro maleic anhydride is also an excellent dienophile to use since it forms adducts even faster than maleic anhydride, and also is lower melting. In impure form (as presently available commercially) it is a liquid at room temperature. It is, therefore, easily blended into the fluid, potentially-reactive mass when solidification of the latter is to be brought about. However, its higher cost at present induces one to forego its advantages in many instances in favor of maleic anhydride. The latter is normally a solid, so for blending with the fluid potentially-reactive mass which is to be solidified, it is desirably ground to a fine powder and mixed in in this form. The anhydride dienophiles are preferred over the acids because the latter liberate water when reacting with the oxirane oxygen groups and their derived hydroxyl groups. This liberated water is generally objectionable in potting, laminating and molding work, but can ordinarily be tolerated in adhesive work or in coating compositions.

The dienophiles are generally and desirably proportioned to the epoxidized drying oil and other epoxy components on a stoichiometric basis, so as to provide one carboxyl group for each hydroxyl group derived from the oxirane oxygen groups; e.g. to provide two carboxyl groups per oxirane oxygen group. Excess amounts over stoichiometric proportions can be employed, however, but large excesses should be avoided as they lead to residual free acidity which impairs the water resistance of the solidified mass. For analogous reasons, an appreciable deficiency of carboxyl groups is desirably avoided as it leads to non-use of some of the available oxirane oxygen groups.

For hardening purposes, i.e. to form the ester linkages which cause solidification of the epoxy/reactive diluent mixture, the polycarboxylic dienophiles can be used in amounts which provide from about 0.2 to 4 carboxyl groups per oxirane oxygen group. For securing both hardening and desired physical, chemical, electrical and other properties, more restricted amounts are usually required, as indicated by my preference above. Moreover, it will be apparent that the amount of polycarboxylic dienophile must be chosen to satisfy two variable factors influencing the physical, chemical, electrical and other properties; namely, the extent of hardening due to ester cross links and the extent of adduct formation both of which may be dictated by the particular properties sought in the finished product. Those skilled in the art will recognize that any particular formulation of a solidifiable composition of the present invention will usually be reached by compromising between complete esterification of oxirane groups on one hand and complete adduct-formation with the reactive diluent component on the other hand. The development of formulations requiring compromises in respect to theoretical ideals is not new to those skilled in the art of resin utilization, and it will be apparent that it is well within the ability of resin formulators to determine the proportions between epoxy component, reactive diluent component, and polycarboxylic dienophile which best serve the formulator's particular purposes.

It will be recognized by those skilled in the art that the epoxy component can be solidified by incorporating polycarboxylic acids and/or anhydrides and/or dienophiles in it without using any reactive diluent. The presence of the latter, however, gives a fluid mass which can be solidified, and in addition, when the reactive diluent is less expensive than the epoxidized drying oil and/or other epoxy materials or the dienophile(s), use of the reactive diluent lowers the average material cost of the finished solidified mass.

Following is a list of the polycarboxylic dienophiles which I presently prefer to use:

Maleic acid or anhydride
Dichloromaleic acid or anhydride
Monochloromaleic acid or anhydride
"Liquid anhydride" (a 50/50 mixture of maleic anhydride and hexahydrophthalic anhydride)

The following examples illustrate the principles of my invention and include the best modes presently known to me for practicing those principles. In those examples wherein the designation "Epoxidized HC drying oil" appears, a Gleason-type sodium-polymerized butadiene (80%)/styrene (20%) drying oil is meant as the drying oil which has been epoxidized by the method disclosed in my copending application Serial No. 515,783, supra.

EXAMPLE 1

A potting compound was prepared from the following materials:

| | G. |
|---|---|
| Epoxidized HC drying oil (98% NVM, 6% oxirane oxygen) | 10 |
| Alloocimene (95% pure) | 3.1 |
| Maleic anhydride | 3.0 |

The first two materials were heated together on a steam cone and when fluid enough to stir were mixed together. The fluid mixture was then cooled somewhat and the anhydride in pulverized form was mixed in by stirring. The resulting mixture was cast into a mold around an article which was to be potted, after which the mold and contents were heated for four hours at 250° F. followed by an additional four hours at 350° F. The potting compound thereby was cured to a hard, transparent, adherent, resinous mass. Shrinkage was determined to be about 2.75%.

EXAMPLE 2

| | G. |
|---|---|
| Epoxidized HC drying oil (98% NVM, 6% oxirane oxygen) | 10 |
| Tung oil | 3.1 |
| Alloocimene (95% pure) | 1.6 |
| Maleic anhydride | 3.0 |

A fluid mixture was prepared from the first three materials and then a potting compound was prepared by adding the anyhdride, all in the manner described in Example 1. The potting compound was then similarly potted and cured. The compound solidified to a transparent, adherent mass, but was not quite as hard as the potted resin of Example 1. In this example, alloocimene was included to increase the fluidity of the potting compound.

EXAMPLE 3

Ten grams of the epoxidized drying oil of Examples 1 and 2 was mixed with 3.1 grams of 95% pure alloocimene on a steam cone and then was cooled to room temperature. Then 4.1 grams of monochloromaleic anhydride (the liquid commercial product) was mixed in at room temperature. A casting was poured and then was heated at 250° F. overnight (16 hours). The resulting casting was hard and clear with a deep orange color.

EXAMPLE 4

A premix was made on a steam cone from:

|  | G. |
|---|---|
| Epoxidized HC drying oil (98% NVM, 6% oxirane oxygen) | 5.7 |
| Alloocimene (95% pure) | 1.8 |
| Epoxidized soya oil (6.3% oxirane oxygen, 100% NVM) | 2.5 |

The premix when at room temperature was a stable, shippable fluid product suitable for use by a customer who would add polycarboxylic dienophile thereto to prepare a potting composition.

To the premix was added 3.5 g. maleic anhydride in pulverized form. After the latter had been mixed in by stirring, the composition was poured into a mold to form a casting. The mold and contents were heated for three hours at 250° F. and then for 3 hours at 350° F. The cooled casting was clear and tough with an orange color, and withstood sharp hammer blows without fracturing.

EXAMPLE 5

|  | G. |
|---|---|
| Epoxidized HC drying oil (100% NVM, 6% oxirane oxygen) | 10.0 |
| Crude epoxidized diallyl phthalate oxirane oxygen=5.0%) | 1.5 |
| Alloocimene (95% pure) | 1.5 |
| Maleic anhydride | 3.5 |

A potting compound was prepared in the manner described in Example 1 and was similarly potted. The potting was cured by heating 4 hours at 250° F. to yield a tough, flexible transparent resin exhibiting small shrinkage during curing. When a similar compound was potted and cured by heating 3 hours at 250° F. followed by 2 hours at 350° F. the resulting resin was found to be very hard and tough, with good adhesion.

The crude expoxidized diallyl phthalate was prepared in the manner described hereinabove.

The maleic anyhdride of Examples 1 and 2, 4 and 5 can be replaced advantageously with a liquid mixture of anhydrides composed of:

|  | Percent by weight |
|---|---|
| Maleic anhydride | 50 |
| Hexahydrophthalic anhydride | 50 |

The liquidity of this mixture further helps to reduce the viscosity of the potting compounds of the said examples. While the hexahydrophthalic anhydride is a saturated acid and hence does not take part in any adduct formation, it is, of course, a dicarboxylic acid which can effect cross-linking between molecules of epoxidized hydrocarbon or glyceride oil, or other sources of epoxy groups which may be present. The following example is illustrative.

EXAMPLE 6

|  | G. |
|---|---|
| Epoxidized HC drying oil (98% NVM, 6% oxirane oxygen) | 10 |
| Alloocimene (95% pure) | 3.1 |
| Liquid anhydride (Becco) | 3.8 |

A fluid mixture was prepared by dissolving the first two components together on a steam cone. The fluid mixture was cooled then the anhydride was added and the resulting mass was potted in a manner described in Example 1, heated for two hours at 250° F., followed by three hours at 350° F. The yellow casting was hard and clear.

EXAMPLE 7

|  | G. |
|---|---|
| Epoxidized HC drying oil (98% NVM, 6% oxirane oxygen) | 10.0 |
| Alloocimene (95% pure) | 1.6 |
| Dehydrated castor oil | 3.1 |
| Powdered maleic anhydride | 3.0 |

A fluid mixture was prepared from the first three materials and then a potting compound was prepared by adding the anhydride, all in the manner described in Example 1. The curing cycle was three hours at 250° F. followed by three hours at 350° F. The compound solidified to a black, hard, brittle mass.

EXAMPLE 8

A premix was made on a steam cone from:

|  | G. |
|---|---|
| Epoxidized HC drying oil (98% NVM, 6% oxirane oxygen) | 6.0 |
| Alloocimene (95% pure) | 3.1 |
| E.P. 201 diepoxide (supra) | 4.0 |

To the premix was added 4.5 g. of "liquid anhydride" and mixed by stirring. The composition was poured into a mold and cured for three hours at 250° F. and three hours at 350° F. The yellow casting was clear and hard.

EXAMPLE 9

|  | G. |
|---|---|
| Epoxidized HC drying oil (100% NVM, 6% oxirane oxygen) | 10.7 |
| Epoxidized diallyl phthalate of Example 5 | 3.2 |
| Maleic anhydride | 4.0 |

A potting compound was prepared from these materials in the manner described in Example 1 and then was similarly potted. The potting was heated 4 hours at 250° F. to cure the resin and the resulting resin was found to have been cured without change in volume, and to give a hard, transparent product exhibiting good adhesion to the mold and potted article.

EXAMPLE 10

|  | G. |
|---|---|
| H.C. drying oil (98% NVM, 6% oxirane oxygen) | 10.0 |
| Alpha-terpinene (93% pure) | 3.0 |
| Maleic anhydride | 3.0 |

A fluid mixture was prepared from the first two materials and then a potting compound was prepared by adding the anhydride. The curing cycle was two hours at 250° F. followed by three hours at 350° F. The yellow casting was tough with some flexibility and had some bubbles due to the impurities in the alpha-terpinene.

EXAMPLE 11

Gleason-type copolymer drying oil prepared by sodium-polymerization of butadiene (80%) and styrene (20%) was epoxidized by the method described in copending application Serial No. 515,783, supra, to an oxirane content of 6.27%, an acid number of 0.54 and an acetyl value of 16.1, all of these constants being measured on the oil at a solids content of 96%. The oil was then blended with an equal weight of E.P. 201 diepoxide (supra) and the resulting mixture was used in the following tests which illustrate that various liquid dicarboxylic anhydrides and various proportions of such to the blend can be used to secure solidification. The anhydride(s) are called "hardeners" in the tabulations, and the term "blend" is used to identify the 50/50 mixture of epoxidized oil and diepoxide.

*Table I*

DODECENYL SUCCINIC ANHYDRIDE

| Parts hardener per 100 parts blend | 51 | 58 | 66 | 93 | 133 | 160 |
|---|---|---|---|---|---|---|
| Barcol hardness: | | | | | | |
| Top | 12-17 | 18-22 | 21-23 | 25 | 23 | 18-20 |
| Bottom | 15-20 | 19-23 | 22-23 | 19-22 | 12 | 2-4 |

*Table II*

| Anhydride Hardener | Anhydride/ Blend (mols) | Hardener Conc.[2] (parts/100 parts) blend | Wt. Loss, Percent | |
|---|---|---|---|---|
| | | | Measured | Corrected[3] |
| Tetrapropenyl succinic | .46 | 69 | 2.9 | 0.9 |
| Becco's "Liq. Anhydride" | .93 | 57 | 5.1 | 3.1 |
| Hexahydrophthalic | 1.1 | 91 | 4.5 | 2.5 |
| Dodecenyl Succinic | .46 | 66 | 2.5 | 0.5 |
| Methyl Nadic [1] | .63 | 61 | 8.4 | 6.4 |

[1] Methylated maleic acid adduct of phthalic anhydride.
[2] Yielding minimum hardness difference.
[3] Corrected weight loss: The measured weight losses have been corrected to take into account the volatiles present in the epoxidized oil. All measurements were made on cast samples approx. 2⅛″ in diameter x ⅜″, weighing approx. 20 grams. Curing was effected by heating the anhydride/blend castings for 16 hours at 250° F. followed by 4 hours at 350° F.

Gelation times for the anhydride/blend mixtures at the optimum anhydride concentrations of Table II were determined and are shown in Table III.

*Table III*

GELATION TIME OF BLEND

| Anhydride Hardener | Hardener Conc. | Approx. gel time at 250° F.= | Approx. gel time at 350° F.= | Percent Weight Loss [1] |
|---|---|---|---|---|
| | | *Min.* | *Sec.* | |
| Tetrapropenyl succinic | 69 | 12 | 50 | 2.9 |
| Dodecenyl succinic | 66 | 9.5 | 50 | 2.5 |
| Methyl Nadic | 61 | 14 | 80 | 8.4 |
| Hexahydrophthalic | 91 | 10.5 | 45 | 4.5 |
| Becco's "Liq. Anhydride" | 57 | 2.5 | 20 | 5.1 |

[1] Includes the volatiles present in the epoxidized oil. Cure schedule 16 hours at 250° F. plus 4 hours at 350° F.

Maximum Barcol hardness values obtained from anhydride/blend mixtures employing the said curing treatment and the foregoing anhydrides are shown in Table IV.

*Table IV*

Anhydride hardener:        Max. Barcol hardness
 Tetrapropenyl succinic _____ 20.5
 Dodecenyl succinic _____ 22.5
 Methyl Nadic _____ 37.0
 Becco "liq. anhydride" _____ 44.0
 Hexahydrophthalic _____ 44.0

EXAMPLE 12

The epoxidized copolymer drying oil of Example 1 was replaced with an equivalent, similarly-epoxidized derivative of the peroxide-polymerized polybutadiene of Synthesis Method A of U.S. Patent 2,669,526. The said derivative had an oxirane content of 6%, and a solids content of 97%. The resulting mixture of said derivative with alloocimene and maleic anhydride was cast and cured in the manner described in Example 1 and yielded a hard, transparent, adherent casting.

EXAMPLE 13

In like manner, polybutadiene which had been prepared in accordance with Example 1 of U.S. Patent 2,708,639 by using as catalyst a $BF_3$-diethyl ether complex, was epoxidized by the method of my copending application Serial No. 515,783 to an oxirane content of 6%. The resulting epoxidized derivative was used in place of the epoxidized copolymer oil of Example 1 hereinabove and a casting was prepared from the resulting mixture in identical manner with analogous results.

EXAMPLE 14

Various samples of a copylmer of butadiene (40%)/propylene (60%) prepared in the manner described in Example 2 of U.S. Patent 2,569,383 by employing $BF_3$ gas as a catalyst were epoxidized by the method described in application Serial No. 515,783, supra, to oxirane oxygen contents between 2.5% and 2.9% by weight.

The epoxidized polymers were solidified by heating as in Example 1 after mixing 2 grams dichloromaleic anhydride with 10 grams of each of the epoxidized polymers, and with 3.1 g. alloocimene.

EXAMPLE 15

A copolymer of butadiene 40%/isoprene (60%) conforming to Example 9 of U.S. Patent 2,569,383 was epoxidized by the method of S.N. 515,783, supra, and then was solidified by treating in the manner described in Example 14.

EXAMPLE 16

An oily copolymer prepared from about 75% butadiene and 25% styrene and polymerized in emulsion form by means of a free-radical mechanism (peroxide catalyst) was epoxidized in the manner described in S.N. 515,783, supra, to an oxirane content of about 6% by weight. It was solidified by mixing and heating with dichloromaleic anhydride under the conditions and proportions set forth in Example 14.

It has been indicated hereinabove that one object of my invention is to provide a fluid, stable product which can be shipped in commerce, and to which a purchaser or user can add suitable polycarboxylic dienophile to prepare a solidifiable composition. Any of the premixes indicated in the foregoing examples constitute examples of such a stable shippable product. Such products need not be used solely to produce clear pottings, castings, moldings, adhesives, laminating resins, coatings, etc. It will be understood that where one wants to produce translucent or opaque solidified products, any of the conventional acid-resistant pigments, fillers, extenders and/or bulking solids can be added by the manufacturer of the fluid, stable, potentially-reactive mass of epoxidized drying oil and reactive solvent, or can be added by his customer. The customer will, of course, add the polycarboxylic dienophile(s) needed to solidify the so-modified products.

It will be understood that the clear, translucent or opaque products can be used (after acidification) as a binder or impregnant. Thus fibre-glass-reinforced articles can be prepared, as can similar articles reinforced with other acid-resistant or acid-tolerating fibrous materials such as asbestos, hemp, sisal, cotton, synthetic fibres, paper, cloth, etc. Such products can be prepared in a variety of ways already well-known to those skilled in such art.

Curing of the acidified, fluid compositions described herein can be effected slowly at room temperature or more rapidly under moderate heating. Where heat is used, it is desirable to avoid temperatures which induce volatilization of the reactive diluent(s) or other materials of the mass. While such volatilization does no harm as far as curing is concerned, it will, of course, reduce the ratio of diluent component to epoxy component, and in the case of volatile epoxy material lead to excess acidity. In any case, volatilization entails a waste of valuable material. It can also cause porosity in the finished products.

When castings (as distinguished from pottings) are being prepared (e.g. dies for sheet metal forming), it is desirable to use parting materials on the surfaces of the mold which contact the cast resinous mass. Such parting materials should, of course, be acid-resistant so that no neutralization of the polycarboxylic material(s) of the compositions will occur at the interfaces. Likewise where free-films are to be produced, the forming carrier such as a metal belt should be surfaced with an appropriate parting material which will not impair the gloss or other finish which is desired on the surface of the resulting film.

Having now described my invention, what I claim is:

1. A fluid, reactive composition which reacts to produce a solid reaction product and whose fluid unreacted but solidifiable component comprises essentially:

A. an epoxy component composed essentially of material selected from the group consisting of (a) epoxidized polymeric hydrocarbon drying oil containing residues of conjugated diolefins and having an oxirane oxygen content of at least about 2.3% by weight; (b) epoxidized glyceride oil having an oxirane content between about 2.3% and 7.5% by weight; (c) diepoxides of cycloaliphatic esters having a structure conforming to the general formula:

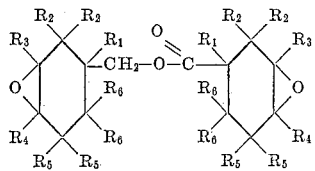

wherein $R_1$ through $R_6$ represent members selected from the group consisting of hydrogen and lower alkyl radicals; (d) crude, monoepoxide of diallyl esters of dicarboxylic acids; (e) glycidyl allyl esters of dicarboxylic acids; (f) polymeric polyether resinous derivatives of polyhydric phenols, said derivatives having alternating aromatic and aliphatic nuclei united together through ether oxygen, having terminal 1,2 epoxy groups and being free of functional groups other than epoxy and hydroxyl groups; and (g) mixtures of the foregoing;

B. monomeric polycarboxylic acidic dienophile selected from the group consisting of $\alpha, \beta$ unsaturated polycarboxylic acid and anhydrides thereof, said dienophiles being employed substantially in an amount which provides about 0.2–4 carboxyl groups for each oxirane oxygen group in said epoxy component; and C. a reactive diluent component having low volatility at temperatures up to about 350° F. and having a melting point below about 70° C., said diluent component being compatible with said epoxy component, being essentially of ethylenically-unsaturated organic material of the foregoing physical properties and being capable of forming Diels-Alder adducts with monomeric $\alpha, \beta$ unsaturated polycarboxylic dienophiles, said ethylenically-unsaturated material being selected from the group consisting of ocimene, alloocimene, myrcene, $\alpha$-terpinene, $\beta$-phellandrene, 2,4(8) p-menthadiene, 2,4(5) p-menthadiene and 3,8 p-menthadiene, conjugted linseed oil, conjugated soybean oil, tung oil, dehydrated castor oil and oiticica oil, and mixtures thereof, and being present in amounts not substantially exceeding that which can be converted to Diels-Alder adduct with the said monomeric polycarboxylic dienophile.

2. A composition as claimed in claim 1 wherein said epoxidized hydrocarbon drying oil constitutes at least 50% of the total weight of A plus C, and wherein said monomeric polycarboxylic acidic dienophiles are selected from the group consisting of maleic acid, dichloromaleic acid, monochloromaleic acid, their anhydrides, mixtures of said materials with each other and liquid, approximately 50/50 mixtures of maleic anhydride with hexahydrophthalic anhydride.

3. A composition as claimed in claim 1 wherein said epoxidized hydrocarbon drying oil constitutes the whole of said epoxy component.

4. A composition as claimed in claim 3 wherein said epoxidized hydrocarbon drying oil, prior to epoxidation, had been prepared from polymerizable material selected from the group consisting of conjugated diolefins having 4–6 carbons, and mixtures of said conjugated diolefins with copolymerizable monomeric compounds containing the $CH_2=CH-$ group.

5. A composition as claimed in claim 4 wherein the reactive diluent component comprises conjugated normally-liquid terpenic material.

6. A composition as claimed in claim 5 wherein said conjugated terpenic material is aliphatic.

7. A composition as claimed in claim 6 wherein said aliphatic terpenic material is alloocimene.

8. A composition as claimed in claim 7 wherein said alloocimene constitutes the entire reactive diluent component.

9. A composition as claimed in claim 7 wherein the balance of said reactive diluent component consists of glyceride ester drying oil selected from the group consisting of tung oil, dehydrated castor oil, oiticica oil, conjugated linseed oil, conjugated soya bean oil and mixtures thereof.

10. A composition as claimed in claim 5 wherein the balance of said reactive diluent component consists of glyceride ester drying oil selected from the group consisting of tung oil, dehydrated castor oil, oiticica oil, conjugated linseed oil, conjugated soya bean oil, and mixtures thereof.

11. A composition as claimed in claim 5 wherein said epoxidized hydrocarbon drying oil, prior to being epoxidized, had a molecular weight between about 1000 and 15000 and had been prepared by polymerizing in the presence of metallic sodium 60–100% by weight of conjugated diene having 4–6 carbon atoms, balance monocyclic vinyl aromatic compound.

12. The solid reaction product which results from the composition claimed in claim 1.

13. The solid reaction product which results from the composition claimed in claim 2.

14. The solid reaction product which results from the composition claimed in claim 4.

15. The solid reaction product which results from the composition claimed in claim 5.

16. The solid reaction product which results from the composition claimed in claim 8.

17. The solid reaction product which results from the composition claimed in claim 9.

18. The solid reaction product which results from the composition claimed in claim 10.

19. The solid reaction product which results from the composition claimed in claim 11.

20. In a method for the production of solidified resins wherein an epoxidized hydrocarbon polymer containing residues of a conjugated diolefin and having at least 10% of its double bonds epoxidized is mixed with polycarboxylic acidic material selected from the group of monomeric polycarboxylic acids and their anhydrides, and then warmed, the improvements which consist in blending said epoxidized oil with a compatible reactive diluent component composed mainly of ethylenically-unsaturated materials which are capable of forming Diels-Alder adducts with polycarboxylic dienophiles, and then mixing and warming the resulting blend with enough monomeric polycarboxylic dienophile to provide between about .2 and 4 carboxyl groups per oxirane oxygen group in said epoxidized oil, and to form Diels-Alder adducts with at least a part of the adducting forming materials in said reactive diluent component; said reactive diluent component being composed essentially of at least one material selected from the group consisting of ocimene, alloocimene, myrcene, α-terpinene, β-phellandrene, 2,4(8) p-menthadiene, 2,4(5) p-menthadiene, 3,8 p-menthadiene, conjugated linseed oil, conjugated soybean oil, tung oil, dehydrated castor oil and oiticica oil.

21. The process claimed in claim 20 wherein said monomeric polycarboxylic acidic dienophiles are selected from the group consisting of maleic acid, dichloromaleic acid, monochloromaleic acid, their anhydrides, and mixtures of said materials.

References Cited in the file of this patent

UNITED STATES PATENTS

| | | |
|---|---|---|
| 2,569,502 | Swern et al. | Oct. 2, 1951 |
| 2,707,177 | Skiff et al. | Apr. 26, 1955 |
| 2,709,690 | Narracott | May 31, 1955 |
| 2,733,222 | Beacham | Jan. 31, 1956 |
| 2,846,410 | Armitage et al. | Aug. 5, 1958 |
| 2,890,195 | Phillips et al. | June 9, 1959 |
| 2,890,196 | Phillips et al. | June 9, 1959 |